United States Patent
Nesbitt et al.

(12) 
(10) Patent No.: US 6,418,544 B1
(45) Date of Patent: Jul. 9, 2002

(54) USE OF A CLIENT META-CACHE FOR REALISTIC HIGH-LEVEL WEB SERVER STRESS TESTING WITH MINIMAL CLIENT FOOTPRINT

(75) Inventors: Richard Elderkin Nesbitt, Cary; Robert John Schroder, II, Durham; Kevin Edward Vaughan, Apex, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/338,378

(22) Filed: Jun. 22, 1999

(51) Int. Cl.[7] ................................................. G06F 11/26
(52) U.S. Cl. ......................................... 714/43; 709/224
(58) Field of Search ..................... 714/43, 4; 709/203, 709/224

(56) References Cited

U.S. PATENT DOCUMENTS 5,812,780 A * 9/1998 Chen et al. ................. 709/224
6,324,492 B1 * 11/2001 Rowe ........................... 703/13

* cited by examiner

*Primary Examiner*—Scott T. Baderman
(74) *Attorney, Agent, or Firm*—A. Bruce Clay; Marcia L. Doubet

(57) ABSTRACT

A method, system, and computer readable code for improving stress testing of Web servers. An altered form of client cache is used, enabling more realistic and representative client requests to be issued during the testing process. This altered cache format is referred to herein as a "meta-cache", and is defined as storing a minimal subset of the information that would typically be cached from a response. This minimal subset is that which enables constructing conditional HyperText Transfer Protocol (HTTP) GET requests. By providing a capability for realistically simulating conditional requests as well as unconditional requests, the stress applied to the server is more representative of the actual traffic load it will experience. By minimizing the amount of information kept in the meta-cache, this realistic simulation is possible without the overhead of a full client cache, and also allows more browsers to be simulated from a particular workstation.

15 Claims, 5 Drawing Sheets

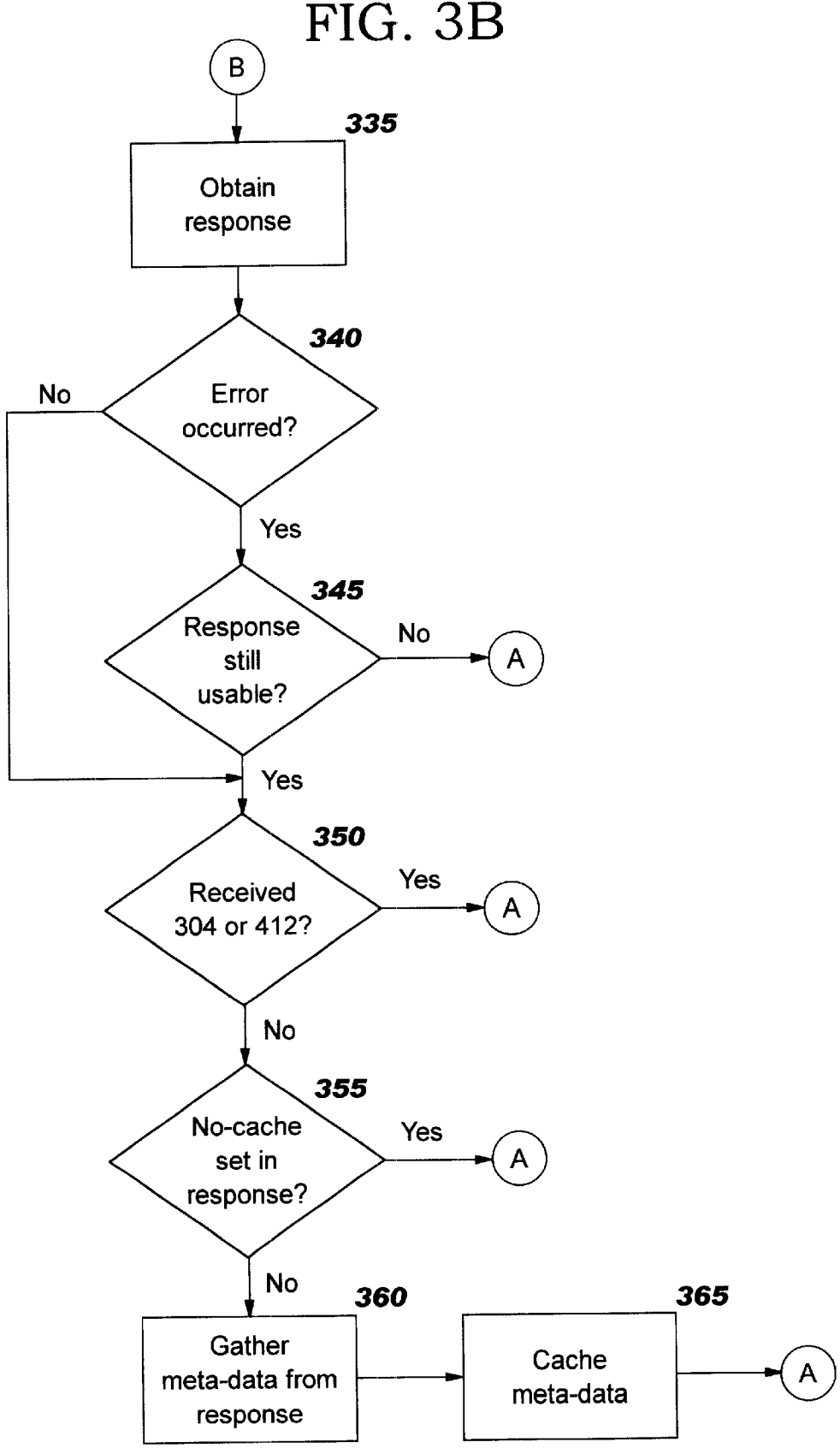

FIG. 4

| 400 | Uniform Resource Locator 410 | Entity tags(s) 420 | Last Modified date 430 | Content-Length 440 | Check-sum 450 | Expires 460 |
|---|---|---|---|---|---|---|
| 401 | www.ibm.com/server1.txt 411 | E1Z9Q7, R3M7TU | Sat, 29 Oct 1994 19:43:31 GMT 431 | 2048 | 1011 01... | Fri, 29 Oct 1999 19:43:31 GMT |
| 402 | www.ibm.com/server9.html 412 | | Sat, 29 Oct 1994 21:22:23 GMT 432 | 123 | 1100 10... | |
| 403 | www.ibm.com/serverZ.txt 413 | 1A2B3 | | 9876 | 0110 01... | |
| | ... | | | | | |

USE OF A CLIENT META-CACHE FOR REALISTIC HIGH-LEVEL WEB SERVER STRESS TESTING WITH MINIMAL CLIENT FOOTPRINT

BACKGROUND OF THE INVENTION

1. Field of the Invention

The present invention relates to a computer system, and deals more particularly with a method, system, and computer readable code for improving stress testing of Web servers. An altered form of client cache is used, enabling more realistic and representative client requests to be issued during the testing process.

2. Description of the Related Art

Use of the Internet and World Wide Web has skyrocketed in recent years. The Internet is a vast collection of computing resources, interconnected as a network, from sites around the world. It is used every day by millions of people. The World Wide Web (referred to herein as the "Web") is that portion of the Internet which uses the HyperText Transfer Protocol ("HTTP") as a protocol for exchanging messages. (Alternatively, the "HTTPS" protocol can be used, where this protocol is a security-enhanced version of HTTP.)

A user of the Internet typically accesses and uses the Internet by establishing a network connection through the services of an Internet Service Provider (ISP). An ISP provides computer users the ability to dial a telephone number using their computer modem (or other connection facility, such as satellite transmission), thereby establishing a connection to a remote computer owned or managed by the ISP. This remote computer then makes services available to the user's computer. Typical services include: providing a search facility to search throughout the interconnected computers of the Internet for items of interest to the user; a browse capability, for displaying information located with the search facility; and an electronic mail facility, with which the user can send and receive mail messages from other computer users.

The user working in a Web environment will have software running on his computer to allow him to create and send requests for information, and to see the results. These functions are typically combined in what is referred to as a "Web browser", or "browser". After the user has created his request using the browser, the request message is sent out into the Internet for processing. The target of the request message is one of the interconnected computers in the Internet network. That computer will receive the message, attempt to find the data satisfying the user's request, and return the located information to the browser software running on the user's computer.

This is an example of a client-server model of computing, where the machine at which the user requests information is referred to as the client, and the computer that locates the information and returns it to the client is the server. In the Web environment, the server is referred to as a "Web server". The client-server model may be extended to what is referred to as a "three-tier architecture" or a "multi-tier architecture". An extended architecture of this type places the Web server in an intermediate tier, where the added tier(s) typically represent data repositories of information that may be accessed by the Web server as part of the task of processing the client's request.

Because Web applications typically have a human user waiting for the response to the client requests, responses from the Web server must be returned very quickly, or the user will become dissatisfied with the service. Usage volumes for a server may be very large: a particular server may receive thousands, or even millions, of client requests in a day's time. These requests must all be handled with acceptable response times, or the users may switch to a competitor's application services.

Verifying that a server, and an application that will run on the server, can handle its expected traffic is a normal part of a stress testing process. Stress testing aims to uncover performance problems before a system goes into actual use, and is performed using simulated traffic. In this manner, any performance problems that are detected from the simulated traffic load can be addressed before any "real" users are impacted. To maximize the usefulness of the stress testing, the tests that are conducted need to be as realistic as possible. In the Web server environment, this means accurately predicting and simulating the number of requests that must be serviced, the type of requests (and mix of request types) that are received, the number of different clients sending requests, etc.

The requests received at a server typically originate from a client's browser. (Requests from other sources are outside the scope of the present discussion.) Browsers often make use of a client-side cache, where a local copy of Web documents may be stored after retrieving the document from a server. A browser using the cache checks for a user-requested document in this client-side cache, before requesting it from the server. Browsers implementing the Hypertext Transfer Protocol version 1.1 ("HTTP/1.1") use an expiration mechanism and a validation mechanism with the client-side cache. These mechanisms are described in detail in sections 13.2 ("Expiration Model") and 13.3 ("Validation Model") of the HTTP specification, respectively, and are introduced in section 13 ("Caching in HTTP"). (The HTTP specification is available on the Web at http://info.internet.isi.edi/in-notes/rfc/files/rfc2068.txt.) The expiration mechanism provides that when an unexpired copy of the document is available in the cache, the response time to the user can be minimized by using this cached copy, thereby avoiding a network round trip to the server. When a copy of a document is in the cache, but it is unclear whether this version remains valid, the validation mechanism provides for reducing the network bandwidth by sending a conditional request to the server. A conditional request identifies the version of a document stored at the client by sending a "cache validator" to the server, which is a value the server uses to determine the validity of the client's document. If the server determines that this version is still valid, it responds with a short message to indicate this to the client's browser; the browser will then retrieve the locally-stored copy. Otherwise, when the client's stored copy is no longer valid, the server responds with a fresh copy. The browser uses this returned copy in response to the user's request, and will typically store this copy into the client-side cache.

To provide a meaningful stress test of a Web server, it is necessary to simulate the traffic generated by a single browser as realistically as possible, and to simulate a realistic number of browsers, as previously mentioned. A very large number of browsers (perhaps thousands) may need to be simulated for some environments. Typically, a single client machine will be used to simulate multiple browsers, to limit the number of client machines that are required. For each simulated browser, a number of system resources are required on the client machine on which the browser operates. This often implies that trade-offs in the testing are required for system resources which are in limited supply.

When caching browsers are simulated, the client-side cache is one such resource. An actual client cache for a single client can consume a very large amount of storage, on the order of hundreds of thousands (or even millions) of bytes. When simulating caching browsers, an upper bound may be placed on the number of simulated browsers in order to limit the cache storage requirements, but this will reduce the effectiveness of the testing. In particular, imposing a limit on the number of client browsers that can be simulated during a stress test may greatly reduce the ability for the test to provide realistic, representative traffic and to therefore provide useful results. As an alternative to limiting the number of simulated browsers, additional storage resources may be added, but this often greatly increases the expense (and perhaps the complexity) of the testing environment.

Several prior art test tool approaches are known, which implement different approaches for dealing with client-side caching browsers. First, an entire cache is sometimes used, in the same manner as an actual cache would be maintained. This approach has the disadvantage of requiring a very large amount of storage (also known as requiring a large "footprint" on the client machine), which necessitates a limit on the number of clients that can be simulated. As just discussed, the results obtained when using this approach for stress testing are not likely to be realistic nor representative. In a second approach, mindful of the need to conserve cache storage, all large object requests are filtered out. For example, image files are a common part of most Web pages, but a single image may require as much as several megabytes of storage. Other types of objects which tend to be large include video clips and sound files. Filtering a request for of these types of objects involves suppressing the request from the browser, thereby conserving the storage space that would have been used to store the response. This has the disadvantage of reducing the realism of the test, because an actual user session would often request these large objects. Thus, the stress applied to the server is unrealistically lowered when these requests are filtered out. A third approach creates a testing scenario by recording an actual client browser session. This recorded session is then played back during testing, to simulate interactions with an actual user. (Typically, the recorded session is replicated to simulate many users.) The disadvantage of this approach is that all browser actions are predetermined, and therefore static: there is no way to introduce conditional messages that exercise the conditional cache validation mechanisms described above unless such messages occurred during the actual session. Even when such conditional messages were recorded, the results of the actual session may cause the recorded session to behave differently with respect to the cache, because the recorded session may see unexpired and still-valid data that was retrieved during the actual session. Thus, the ability to simulate a realistic stress test using HTTP/1.1 caching mechanisms is seriously inhibited.

Accordingly, a need exists for a technique by which these problems in the current test tools for Web servers can be overcome. This technique should enable realistically simulating traffic to stress a Web server, while minimizing the client footprint used in creating the realistic traffic load.

SUMMARY OF THE INVENTION

An object of the present invention is to provide a technique to improve stress testing of Web servers.

Another object of the present invention is to provide a technique whereby client-side caching is factored into Web server stress testing.

It is a further object of the present invention to enable Web server stress testing to be more realistic and representative than in the current art, while minimizing the client footprint my required to support the testing environment.

It is another object of the present invention to provide a technique for Web server stress testing that uses conditional document retrieval requests that exercise cache validation mechanisms.

It is yet another object of the present invention to provide this technique in a manner that reduces the required information for cached documents, while still enabling conditional requests to operate.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a system, method, and computer-readable code for use in a computing environment having a connection to a network, for improving stress testing of a Web server. This technique comprises: executing one or more client processes on one or more client machines, each of the client processes communicating with a server under test according to a first networking protocol; creating a meta-cache for each of the client processes during a stress test of the server, the meta-cache replacing a client-side cache used by the client process in an actual network communication to the server using the first protocol; and using the meta-cache during the stress test. Using the meta-cache further comprises: determining whether to send an unconditional request or a conditional request to the server; sending the unconditional request, wherein the unconditional request is generated without using the meta-cache; and sending the conditional request, wherein the conditional request is generated using the meta-cache.

Using the meta-cache step preferably further comprises selecting a target Uniform Resource Locator (URL), and the unconditional and conditional requests are preferably sent using this selected URL. Preferably, determining whether to send an unconditional or conditional request further comprises accessing the meta-cache using the selected URL to determine if a corresponding meta-cache entry exists, and an unconditional request is used when the entry is not located. Optionally, this determination may be a changeable decision as to sending to the unconditional or the conditional request.

Preferably, the meta-cache comprises a plurality of entries, each of the entries comprising: a particular URL identifier for the entry; zero or more entity tag values; an optional last-modified date value; a content-length value; a checksum value; and an optional expiration date value.

The present invention will now be described with reference to the following drawings, in which like reference numbers denote the same element throughout.

BRIEF DESCRIPTION OF THE DRAWINGS

FIGS. 3A–B illustrate a flow chart which sets forth the preferred embodiment of the logic involved with using the present invention to generate requests from a client browser during a stress test of a Web server; and FIG. 4 illustrates the layout of the meta-cache defined for use with the preferred embodiment of the present invention.

DESCRIPTION OF THE PREFERRED EMBODIMENT

Figure 1:
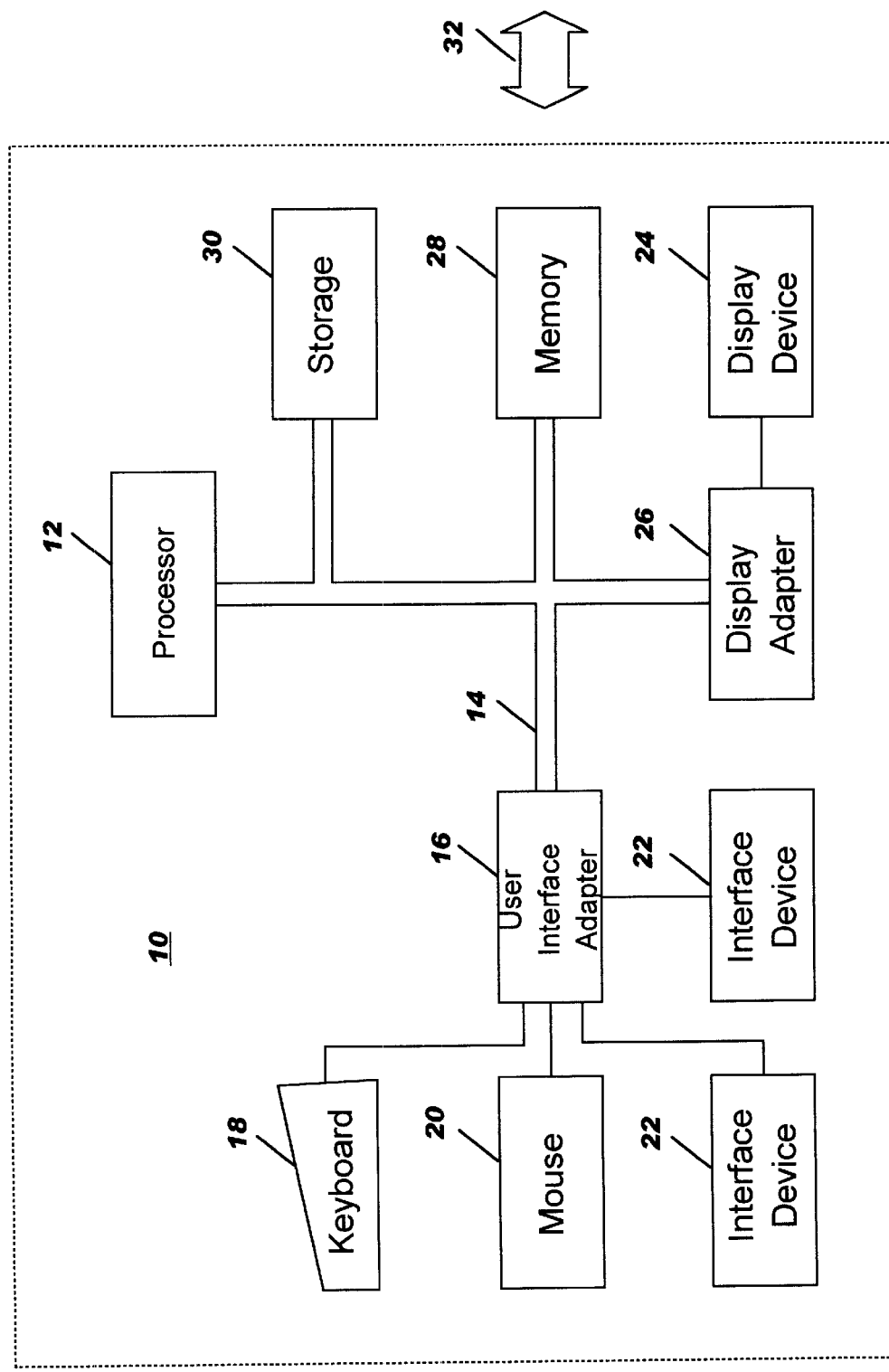
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microproccesor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
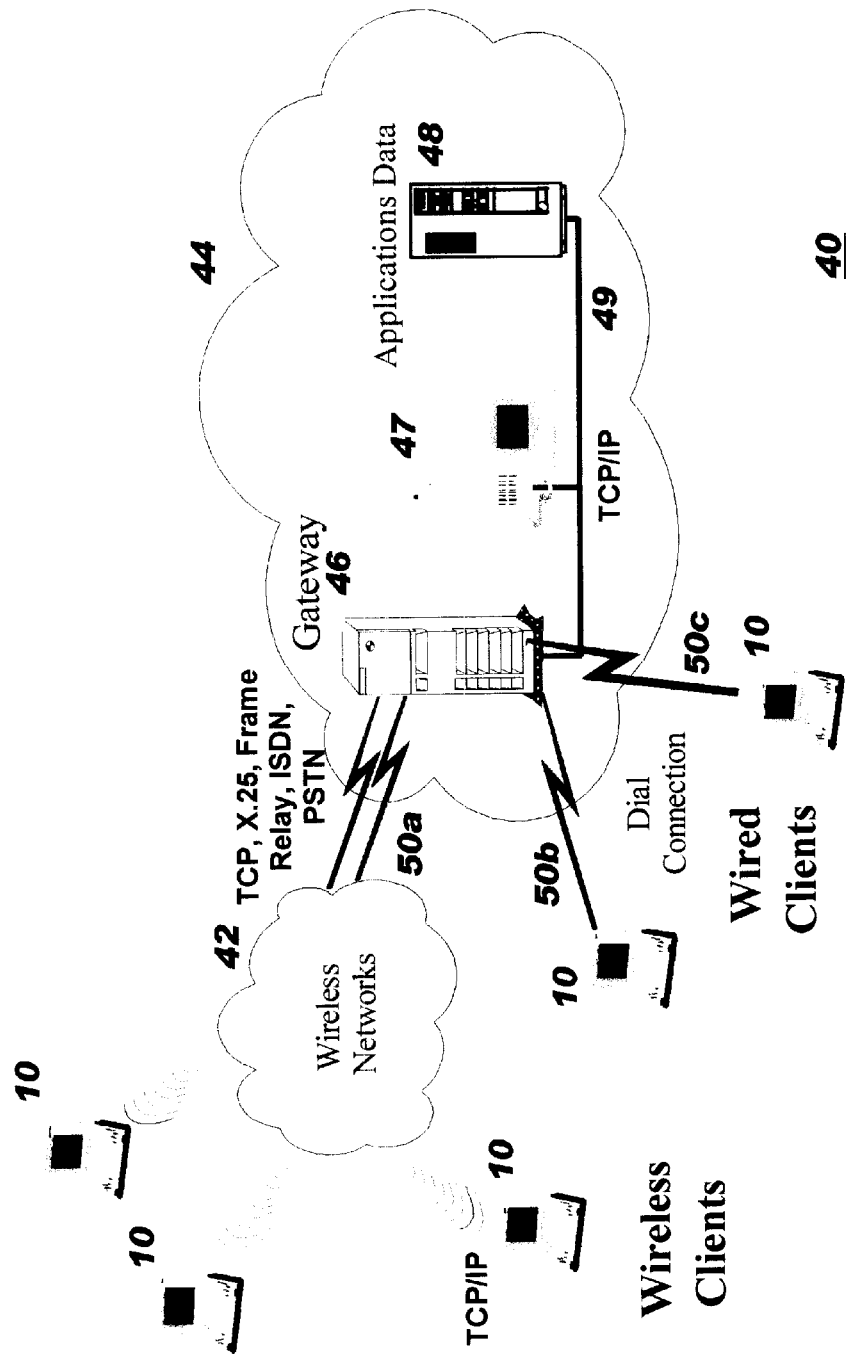
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A client computer on which the present invention operates may be connected to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The client computer may be any type of computer processor, including laptop, handheld or mobile computers; vehicle-mounted devices; desktop computers; mainframe computers; etc., having processing (and optionally communication) capabilities. The remote server, similarly, can be one of any number of different types of computer which have processing and communication capabilities. These techniques are well known in the art, and the hardware devices and software which enable their use are readily available. Hereinafter, the client computer will be referred to equivalently as a "workstation", "machine", "device", or "computer", and use of any of these terms or the term "server" refers to any of the types of computing devices described above.

The preferred embodiment of the present invention will now be discussed in more detail with reference to FIGS. 3A–B and 4.

In the preferred embodiment, the present invention is implemented as one or more modules (also referred to as code subroutines, or "objects" in object-oriented programming) of a computer software program. This program will be used to create traffic that simulates a client browser sending requests for data to a server. Typically, the program will be used in an Internet environment, where the server is a Web server and the request is formatted using HTTP). Alternatively, the server may be in a corporate intranet, an extranet, or in any other network environment. Use of the term "Internet" herein, when discussing processing associated with the client request, includes processing that occurs in these other network environments, unless otherwise stated. The program code of the preferred embodiment may be implemented as objects in an object-oriented programming language, or in a conventional procedurally-oriented language, or in a mix of object-oriented and procedural language code.

Figure 3A:
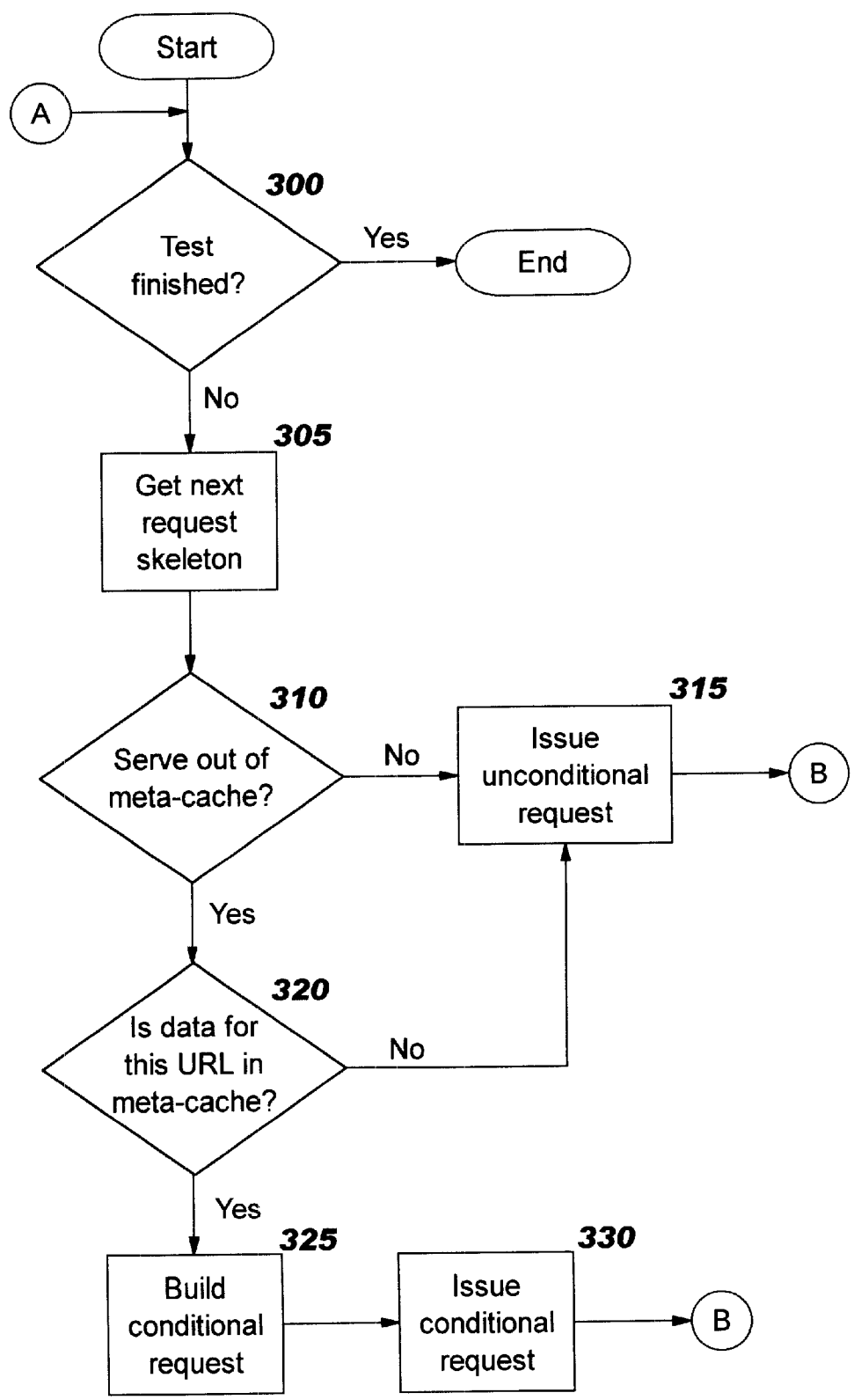

FIGS. 3A and 3B illustrate the logic used in a preferred embodiment of the present invention to generate requests from a client browser during a stress test of a Web server. Multiple invocations of this logic are preferably used in a single workstation in order to simulate multiple client browsers. Each invocation may be a separate process or a separate thread in a multitasking operating system, using techniques which are well known in the art. In the preferred embodiment, threads will be used, as they are lighter weight than processes. In an alternative embodiment, processes may be used. (Hereinafter, the terms "thread" and "process" are to be considered interchangeable.) Invocation of these threads will preferably be done by a test manager module (or object) which has responsibility for synchronizing operation of the stress test, and which does not form part of the present invention. In addition, multiple workstations may be operating the stress testing code simultaneously, where each workstation will have multiple threads executing the logic of FIGS. 3A–B.

The processing of FIG. 3A begins at Block 300, where a test is made to determine whether to the testing is finished. If this test has a positive response, the processing of FIG. 3A ends. A number of different techniques may be used for indicating that the testing is finished, as will be obvious to one of skill in the art. For example, the module from which the thread is invoked may close the thread, or send a signal that execution is to stop. Or, an iteration counter may be used, which is initially set to zero and then incremented on each pass through FIGS. 3A–B until reaching some predetermined value. When the test is not yet finished, then processing continues to Block 305.

At Block 305, the next request skeleton for use in generating requests is obtained. A request skeleton is a stored request layout that will be used to generate a request for a Web document. This skeleton includes the URL (Uniform Resource Locator) used to identify the requested page on the server being stress tested. Preferably, a number of different URLs (and therefore different request skeletons) will be used during the testing, in order to increase the realism of the test. These skeletons are preferably stored in a sequential manner, such that each iteration of the logic of FIGS. 3A–B will use the next skeleton from the sequence (with the entire sequence being used repeatedly as needed). Alternatively, it may be desired to randomly access the stored skeletons, using techniques which are known in the art. The content of the request skeletons, and the pattern of their use, will depend on the type of traffic that is best suited to a particular Web server. In addition, the skeleton content will reflect the browser being simulated, by storing values to be used for the User-Agent header field of the generated HTTP request. Note that while the preferred embodiment contemplates statically storing information in this skeleton format, in order to reduce processing time when generating requests, an alternative embodiment may store only URLs in this manner (generating the remainder of the request information using programming instructions).

Block 310 then checks to see whether a request that exercises caching mechanisms should be generated. It will be obvious to one of skill in the art that the Web documents corresponding to the stored request skeletons will likely be cached in the client-side meta-cache of the present invention very early during the stress testing process (e. g. after the first successful retrieval of the page, provided it does not have the HTTP Cache-Control directive set to "no-cache"). Thus, it is necessary to ignore this cached information in some number of the generated requests, in order to generate a more realistic mix of client requests, where some requests are unconditional and others are conditional. (In addition, this enables simulating the situation where a cache is purged, or pages are reloaded into the cache, during an actual client session.) Preferably, a test configuration parameter will be used to specify a percentage of requests that ignore the presence of the meta-cache information. For example, 70 percent of the requests may ignore the meta-cache (and therefore generate unconditional requests for the Web document) while the remaining 30 percent will use Ale meta-cache (and therefore generate conditional requests). A randomizing technique may be used in Block 310 to enforce this percentage, the details of which do not form part of the present invention. Or, a simple counting technique may be used, which counts the number of iterations of FIGS. 3A–B to determine when to switch between selecting unconditional requests (i.e. a negative result in Block 310) and conditional requests (i.e. a positive result in Block 310).

When the "No" branch is taken from Block 310, an unconditional request will be issued at Block 315 using the selected request skeleton. This request is an HTTP "GET" request, formatted in accordance with the requirements of the HTTP 1.1 specification. Control transfers to Block 335 following issuance of this request.

When the "Yes" branch is taken from Block 310, on the other hand, a further check is performed at Block 320 to determine whether information for the current request skeleton is already stored in the meta-cache. The meta-cache is described in more detail below with reference to Block 325 and is illustrated in FIG. 4, and comprises information received from previous responses to requests for the URLs in the request skeletons. The URL of the current request is used in Block 320 to access the meta-cache. If no entry for this URL is located, Block 320 has a negative response, and control transfers to Block 315 to issue an unconditional request. If an entry is located in the meta-cache, Block 320 has a positive response, and processing continues at Block 325.

Block 325 builds a conditional request for the current request skeleton using the information stored in the meta-cache. This request is an HTTP "GET" request, formatted in accordance with the requirements of the HTTP 1.1 specification for conditional requests. In particular, the request will include one or more cache validators. The particular validators to be used, and their values, are determined from the entry in the meta-cache. Referring now to the meta-cache example 400 depicted in FIG. 4, elements 401, 402, 403 depict representative entries for particular URLs 411, 412, 413. Preferably, the meta-cache is indexed or hashed using the URL values 410. It will be obvious to one of skill in the art that the number of entries in the meta-cache changes over time to reflect the URLs used in the testing, and that many more than 3 entries will exist in a typical meta-cache. The 3 entries shown in FIG. 4 are merely for purposes of illustration.

If the meta-cache entry (401, 402, 403, etc.) includes an entity tag value 420, then this value must be used as a cache validator on any conditional request ( according to section 13.3.4 of the HTTP specification). Either an "If-Match" or an "If-None-Match" request header field will be constructed with this value, according to sections 14.25 or 14.26 of the HTTP specification, respectively. That is, the appropriate request header ("If-Match" or "If-Non-Match") will be followed by a colon, which is then followed by a comma-separated list of the quoted entity tag value or values. Preferably, these two types of header fields will be used alternatively (for example, by setting a bit that is used to switch between selecting the two types on subsequent iterations of this logic). Alternatively, a weighted percentage approach may be used, which may be a configurable parameter of the test in the same manner described above for the percentage of conditional requests (see the description of Block 310). Consideration is also preferably given to the specific type of client browser being simulated (such as Internet Explorer from Microsoft Corporation, or Netscape Navigator® from Netscape Communication Corporation, etc.) For example, if the browser being simulated does not generate "If-None-Match" conditional requests, then these are preferably omitted by the preferred embodiment.

If the meta-cache entry includes a Last-Modified value 430, then this value is preferably included as a cache validator on conditional requests (according to section 13.3.4 of the HTTP specification). An example of a Last-Modified value is shown at elements 431 and 432, using the date format defined in the HTTP specification. The Last-Modified value is specified on either an "If-Modified-Since" or an "If-Unmodified-Since" request header. Sections 14.24 and 14.28 of the HTTP specification contain the requirements for constructing these request headers, respectively. According to these sections, the appropriate request header ("If-Modified-Since" or "If-Unmodified-Since") will be followed by a colon, which is then followed by the date value (which is obtained from the Last-Modified entry 430 of the meta-cache of the present invention). Preferably, use of these two types of header fields will alternate or will change according to a specified percentage, and will mimic the particular browser being simulated (as described above for "If-Match" and "If-None-Match"). The content-length value 440 may optionally be used on the request to further constrain the server validation process.

Section 13.3.5, "Non-validating Conditionals", of the HTTP specification states that only entity tags and Last-Modified dates are currently used as cache validators. Thus, the preferred embodiment is described herein in terms of creating conditional requests with these values. Should additional validating conditionals be defined for HTTP in the future, it will be obvious how to extend the meta-cache 400 to include additional information for use with those conditionals and how to use this additional meta-cache information when generating conditional requests at Block 325.

Once the conditional request has been constructed, it will be issued as indicated by Block 330. Control then transfers to Block 335.

Block 335 is reached following issuance of either an unconditional or a conditional request. Block 335 waits for the response to be returned from the server. When this response is received, it may indicate that some type of error occurred in the request processing or it may contain the requested information. For example, the socket being used for communication with the Web server may have been closed, generating an error condition. Or, an unexpected response code such as 404, "Not Found", may have been received from the server. The details of handling error conditions are beyond the scope of the present invention. However, the present invention does test in Block 340 for the occurrence of an error, as this will affect whether meta-cache data is to be gathered from the response. (Note that occurrence of a response code 304 or 412 is not considered an error. These response codes are addressed by the logic of Block 350.) If an error did not occur, then control transfers directly from Block 340 to Block 350. Otherwise, when a error did occur, a further test is made at Block 345 to see if the response is still usable for gathering meta-cache information. When this test at Block 345 has a negative result, control returns to Block 300 to begin another iteration of the logic of FIGS. 3A–B otherwise, processing continues at Block 350.

At Block 350, a test is made to determine whether the received response had either of response code 304 ("Not Modified") or 412 ("Precondition Failed"). If this test has a positive response, then no message body has been received. Thus, the meta-cache information will not be gathered nor updated, so control transfers directly back to Block 300. When this test has a negative response, then it can be assumed that a response with a message body has been received, and control will continue to Block 355.

Block 355 checks for the presence of Cache-Control directive(s) in the response. If a Cache-Control directive is present, and contains a "no-cache" value, then the server has indicated that this response is not to be cached. While this is a value intended for use by an actual cache, the present invention also applies the no-cache semantics to the meta-cache to provide a realistic simulation of the response handling. Accordingly, if the "no-cache" directive has been specified on this response, then processing of this response ends. Control will transfer from Block 355 to Block 300. If the no-cache directive was not specified, then processing continues to Block 360.

Block 360 gathers information from the response, which will then be used to update the meta-cache in Block 365. (It will be obvious to one of skill in the art that the processing of these two blocks may be intermingled. They are shown separately in FIG. 3B for purposes of illustration.) According to the preferred embodiment, the information to be gathered and stored in the meta-cache comprises: any entity tags that may be present; a Last-Modified date, when present; an Expires date, if present; and the size of the entity body in the response, specified in a Content-Length header. In addition, a checksum value for the response is computed. If an entry already exists for the URL of this response, its contents will be updated to reflect this new response; otherwise, a new entry will be created with this URL as its identifier 410. The entity tags are stored in the entity tag field 420, preferably in the comma-separated format in which they are received. Any existing entity tag values from a previous response should be overwritten when updating the meta-cache. The Last-Modified date is stored in the field 430 of the meta-cache. The content-length is stored in field 440. The computed checksum is stored in field 450, and the expiration date is stored in field 460.

Notably, the actual body of the response message is not being cached by Blocks 360 and 365. As described previously, the meta-cache defined for the present invention enables using only a subset of the information from the response message while still being able to generate conditional HTTP GET requests. In this manner, a large number of client browsers can be simulated using a particular workstation, without the disadvantages of the prior art techniques that have been described (i.e. a very large client footprint, expensive testing resource requirements, trade-offs that lead to reduced effectiveness of the testing results, etc.).

Now that the meta-cache has been updated in a similar manner that an actual client cache would be updated, control returns to Block 300 to begin a new iteration of the request generation process. The updated meta-cache will be used on subsequent iterations, in the same manner that an actual client cache would be used during an actual browser session, as will be obvious.

In an optional aspect of the preferred embodiment, the meta-cache Expires value 440 may be checked upon beginning the processing of Block 325. If this value indicates that the cached information has expired, then control will transfer to Block 315 when this aspect is implemented, where an unconditional request will be generated.

Note that the preferred embodiment is described in terms of repeatedly cycling through the logic of FIGS. 3A–B without delay. It may be desired in a particular environment to introduce random delay into the request generation process (for example, to vary the arrival times of the requests at the server). It will be obvious to one of skill in the art how such delay can be introduced into the logic of FIG. 3 (such as setting and checking a timer before continuing from Block 300 to Block 305, waiting for a synchronization event to be posted, etc.).

The meta-cache 400 is depicted in FIG. 4 using a simple table format. This is for purposes of illustration and not of limitation. Other storage techniques, such as creating a structured object in an object-oriented programming language, may be used without deviating from the inventive concepts disclosed herein.

The preferred embodiment has been described with reference to caching as it is defined or HTTP/1.1. However, the inventive techniques disclosed herein may also be used advantageously for stress testing a Web server using the HTTP 1.0 protocol, with modifications that will be obvious to one of skill in the art to align with the constraints of caching and conditional requests as they apply to this alternative protocol. For example, entity tags are not defined in HTTP 1.0, and thus the meta-cache would not include values for this field nor would the conditional requests include values for an entity tag (i.e. ETag) header field.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. A computer program product on a computer-readable medium in a computer network for improving stress testing of servers, comprising:

a server under test;

one or more client processes executing on one or more client machines, each of said client processes communicating with said server according to a first networking protocol;

computer-readable program code means for creating a meta-cache for each of said one or more client processes during a stress test of said server, said meta-cache replacing a client-side cache used by said client process in an actual network communication to said server using said first protocol; and computer-readable program code means for using said meta-cache during said stress test, further comprising:

computer-readable program code means for determining whether to send an unconditional request or a conditional request to said server;

first computer-readable program code means for sending said unconditional request, wherein said unconditional request is generated without using said meta-cache; and second computer-readable program code means for sending said conditional request, wherein said conditional request is generated using said meta-cache.

2. The program product for improving stress testing of servers according to claim 1, wherein said computer-readable program code means for using said meta-cache further comprises computer-readable program code means for selecting a target Uniform Resource Locator (URL), and wherein said first and said second computer-readable program code means for sending use said selected URL.

3. The program product for improving stress testing of servers according to claim 2, wherein said computer-readable program code means for determining further comprises:

computer-readable program code means for accessing said meta-cache using said selected URL to determine if a corresponding meta-cache entry exists; and wherein said first computer-readable program code means is used when said entry is not located.

4. The program product for improving stress testing of servers according to claim 3, wherein said computer-readable program code means for determining further comprises computer-readable program code means for making a changeable decision as to sending to said unconditional or said conditional request.

5. The program product for improving stress testing of servers according to claim 1, wherein said meta-cache further comprises a plurality of entries, each of said entries comprising:

a particular URL identifier for said entry;

zero or more entity tag values;

an optional last-modified date value;

a content-length value;

a checksum value; and an optional expiration date value.

6. A system for improving stress testing of servers in a computing environment connected to a network, comprising:

a server under test;

one or more client processes executing on one or more client machines, each of said client processes communicating with said server according to a first networking protocol;

means for creating a meta-cache for each of said one or more client processes during a stress test of said server, said meta-cache replacing a client-side cache used by said client process in an actual network communication to said server using said first protocol; and means for using said meta-cache during said stress test, further comprising:

means for determining whether to send an unconditional request or a conditional request to said server;

first means for sending said unconditional request, wherein said unconditional request is generated without using said meta-cache; and second means for sending said conditional request, wherein said conditional request is generated using said meta-cache.

7. The system for improving stress testing of servers according to claim 6, wherein said means for using said meta-cache further comprises means for selecting a target Uniform Resource Locator (URL), and wherein said first and said second means for sending use said selected URL.

8. The system for improving stress testing of servers according to claim 7, wherein said means for determining further comprises:

means for accessing said meta-cache u sing said selected URL to determine if a corresponding meta-cache entry exists; and wherein said first means is used when said entry is not located.

9. The system for improving stress testing of servers according to claim 8, wherein said means for determining further comprises means for making a changeable decision as to sending to said unconditional or said conditional request.

10. The system for improving stress testing of servers according to claim 6, wherein said meta-cache further comprises a plurality of entries, each of said entries comprising:

a particular URL identifier for said entry;

zero or more entity tag values;

an optional last-modified date value;

a content-length value;

a checksum value; and an optional expiration date value.

11. A method for improving stress testing of servers in a computing environment connected to a network, comprising the steps of:

executing one or more client processes on one or more client machines, each of said client processes communicating with a server under test according to a first networking protocol;

creating a meta-cache for each of said one or more client processes during a stress test of said server, said meta-cache replacing a client-side cache used by said client process in an actual network communication to said server using said first protocol; and using said meta-cache during said stress test, further comprising the steps of:determining determining whether to send an unconditional request or a conditional request to said server;

sending said unconditional request, wherein said unconditional request is generated without using said meta-cache; and sending said conditional request, wherein said conditional request is generated using said meta-cache.

12. The method for improving stress testing of servers according to claim 11, wherein said using said meta-cache step further comprises the step of selecting a target Uniform Resource Locator (URL), and wherein said sending said unconditional request step and said sending said conditional request step use said selected URL.

13. The method for improving stress testing of servers according to claim 12, wherein said determining step further comprises the step of:

accessing said meta-cache using said selected URL to determine if a corresponding meta-cache entry exists; and wherein said step of sending said unconditional request is used when said entry is not located.

14. The method for improving stress testing of servers according to claim 13, wherein said determining step further comprises the step of making a changeable decision as to sending to said unconditional or said conditional request.

15. The method for improving stress testing of servers according to claim 11, wherein said meta-cache further comprises a plurality of entries, each of said entries comprising:

a particular URL identifier for said entry;

zero or more entity tag values;

an optional last-modified date value;

a content-length value;

a checksum value; and an optional expiration date value.

* * * * *